(12) United States Patent
Zhou et al.

(10) Patent No.: US 10,150,822 B2
(45) Date of Patent: Dec. 11, 2018

(54) CATALYST COMPONENT FOR OLEFIN POLYMERIZATION, PREPARATION METHOD THEREFOR AND CATALYST THEREOF

(75) Inventors: Qilong Zhou, Beijing (CN); Zhong Tan, Beijing (CN); Xiudong Xu, Beijing (CN); Li'an Yan, Beijing (CN); Weiwei Song, Beijing (CN); Fengkui Li, Beijing (CN); Shanshan Yin, Beijing (CN); Jinhua Yu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 375 days.

(21) Appl. No.: 14/235,340

(22) PCT Filed: Jul. 24, 2012

(86) PCT No.: PCT/CN2012/079072
§ 371 (c)(1),
(2), (4) Date: Feb. 19, 2014

(87) PCT Pub. No.: WO2013/013611
PCT Pub. Date: Jan. 31, 2013

(65) Prior Publication Data
US 2014/0163185 A1    Jun. 12, 2014

(30) Foreign Application Priority Data

Jul. 26, 2011 (CN) .......................... 2011 1 0210004
Jul. 26, 2011 (CN) .......................... 2011 1 0210008

(51) Int. Cl.
*C08F 4/646* (2006.01)
*C08F 110/06* (2006.01)
(Continued)

(52) U.S. Cl.
CPC .......... *C08F 4/6465* (2013.01); *C08F 110/06* (2013.01); *C08F 110/08* (2013.01)

(58) Field of Classification Search
CPC ................................ B01J 31/00; B01J 21/00
(Continued)

(56) References Cited

U.S. PATENT DOCUMENTS 4,552,858 A * 11/1985 Imai .................. C08F 10/00
                                                      502/112
5,723,400 A *  3/1998 Morini ............... C08F 10/00
                                                      502/103
(Continued)

FOREIGN PATENT DOCUMENTS

CN          1 453 298 A     11/2003
CN        101906017 A     12/2010
(Continued)

OTHER PUBLICATIONS

International Search Report (PCT/ISA/210) dated Oct. 4, 2012, by the Chinese Patent Office as the International Searching Authority for International Application No. PCT/CN2012/079072.
Search Report dated Sep. 17, 2014, in corresponding Taiwanese Patent Application No. 201126792.
International Preliminary Report on Patentability (Form PCT/IB/373) and the Written Opinion of the International Searching Authority (From PCT/ISA/237) dated Jan. 28, 2014, by the international Bureau of WIPO in corresponding International Application No. PCT/CN2012/079072. (17 pages).

*Primary Examiner* — Fred M Teskin
(74) *Attorney, Agent, or Firm* — Buchanan Ingersoll & Rooney PC

(57) ABSTRACT

A catalyst component (A) for olefin polymerization is prepared by contacting a solid component (a) containing magnesium, titanium, halogen and an internal electron donor compound with an organosilicon compound (b), wherein the organosilicon compound (b) is one or more selected from a Si—H functional group containing chainlike polysiloxane (b1) represented by formula ($I_x$), a cyclic polysiloxane (b2) represented by formula ($I_y$) and a Si—H functional group containing organosilicon compound (b3) represented by formula ($I_z$). In addition, a process for preparing the catalyst component and the corresponding catalyst is described. The catalyst component and its catalyst have high catalytic activity, good hydrogen response, and good stereospecificity, the catalyst can release its activity more evenly, and the obtained polymer has significantly increased bulk density. The definitions of $R^1$ to $R^{10}$, n and z in the formulae ($I_x$), ($I_y$) and ($I_z$) are as described in the specification.

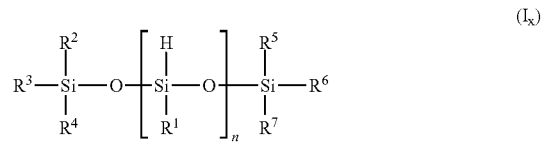

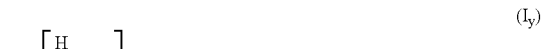

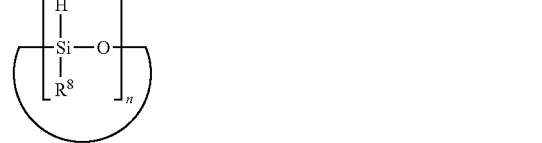

$HSiR^9{}_zR^{10}{}_{3-z}$

23 Claims, No Drawings

(51) Int. Cl.
*C08F 110/08* (2006.01)
*C08F 4/656* (2006.01)

(58) Field of Classification Search
USPC .......................................... 502/116, 158, 232
See application file for complete search history.

(56) References Cited

U.S. PATENT DOCUMENTS

| | | |
|---|---|---|
| 5,932,510 A | 8/1999 | Hosaka et al. |
| 5,945,366 A | 8/1999 | Kataoka et al. |
| 6,200,921 B1 | 3/2001 | Kataoka |
| 6,984,600 B2 | 1/2006 | Chosa et al. |
| 2009/0253874 A1* | 10/2009 | Hosaka .................. C08F 10/00 526/125.3 |

FOREIGN PATENT DOCUMENTS

| | | |
|---|---|---|
| EP | 0 197 310 A2 | 10/1986 |
| EP | 0 790 257 A1 | 8/1997 |
| EP | 1 921 093 A1 | 5/2008 |
| JP | H07-21021 B2 | 3/1995 |
| JP | H09-169808 A | 6/1997 |
| TW | 385318 | 3/2000 |

* cited by examiner

CATALYST COMPONENT FOR OLEFIN POLYMERIZATION, PREPARATION METHOD THEREFOR AND CATALYST THEREOF

TECHNICAL FIELD

The present invention relates to a catalyst component for olefin homopolymerization or copolymerization, to a preparation method therefor and to a catalyst for olefin polymerization.

BACKGROUND ART

As is well known in the art, a solid catalyst component comprising magnesium, titanium, halogen and an internal electron donor as essential ingredients can be used in the polymerization of olefins $CH_2=CHR$. In the polymerization process, the solid catalyst component, an alkyl aluminum compound as a cocatalyst and a siloxane compound as an external electron donor together constitute a catalyst for olefin polymerization, i.e., Ziegler-Natta (Z-N) catalyst. For example, CN1453298 discloses a Z-N catalyst consisting of: (1) a solid catalyst component comprising magnesium, titanium, halogen and a diol ester-based internal electron donor compound as essential components; (2) an alkyl aluminum compound; and (3) an organosiloxane compound containing Si—O—C group. The catalyst has good polymerization activity and stereospecificity. Nevertheless, a catalyst, which has a higher catalytic activity, better stereospecificity and better hydrogen response (that means the resulting polymer has a higher melt index at the same hydrogen amount), and is capable of resulting in a polymer with a high bulk density, is still the pursuit of researchers in this field.

In the continuous process as currently used for preparing polyolefin, two or more reactors in series are generally employed, for example, a liquid phase bulk polymerization reactor connecting with a gas phase polymerization reactor in series or two gas phase polymerization reactors connecting in series, and the like. As is well known by a person skilled in the art, examples of the former include Spheripol process and Hypol process, and examples of the latter include Innovene process and Horizone process. In the production process, the residence time and other parameters in each reactor are controlled according to the performance requirements of specific products and the process conditions, and the total residence time in individual reactors is generally controlled within 2-4 hours. This requires that the Z-N catalyst used can release its activity steadily and evenly throughout the whole process of polymerization. Or else, there will be the problem that the catalyst is too active at the early stage so that the reaction is difficult to be controlled, but not active enough at the later stage. This will directly lead to a reduction in product quality and even fail to meet the performance requirements. Thus, a stable and even release of activity of the Z-N catalyst, on the one hand, contributes to the stability and controllability of the polymerization process, and on the other hand, is favorable for adjusting various parameters in the polymerization process, thereby to produce a product with more excellent performance.

US20090253874 discloses that the catalyst can remain active for an extended period after contacting the solid catalyst component with an organic silane compound containing a functional group $CH_2=CH$ under certain conditions. However, such a compound is difficult to prepare and is expensive.

U.S. Pat. No. 5,932,510 discloses the use of a cyclic siloxane compound in a Z-N catalyst. The catalyst has a high activity, and the polymer prepared thereby has high isotacticity, high bulk density, good particle shape, and less fine dust. US6984600B2 discloses the use of polysiloxane and a cyclic siloxane for preparing a Z-N catalyst. U.S. Pat. No. 5,945,366 discloses that the use of a polysiloxane-treated Z-N catalyst in combination with a non-polysiloxane-treated Z-N catalyst can result in a polymer with high isotacticity, high bulk density and less fine dust. U.S. Pat. No. 6,200,921 B1 discloses the use of a —OH-containing organosilicon compound in a Z-N catalyst to improve the activity of the catalyst and the stereoregularity of the polymer. However, none of the above documents mentions the mandatory existence of Si—H in such polysiloxane and cyclic siloxanes, in particular the effect of such compounds for improving the stable and even release of activity of the catalyst.

The patent EP0197310 as filed in 1986 discloses the use of a Si—H containing polysiloxane in a Z-N catalyst. The preparation method of the catalyst used in this patent comprises the steps of: contacting magnesium chloride, alkoxy titanium, hydrogen-containing polysiloxane and optional alcohol to obtain a solid component; contacting the solid component with an acyl chloride compound (e.g., phthaloyl chloride), silicon tetrachloride and optional titanium tetrachloride to obtain a catalyst component; and contacting the catalyst component with an alkyl aluminum, an external electron donor (such as organosiloxane) to obtain a Z-N catalyst for olefin polymerization. When used for catalyzing polymerization under certain polymerization conditions for 2 hours, the catalyst as obtained in this patent exhibits a polymerization activity of 3.5-12.1 kg of polypropylene per g of the catalyst (calculated from the polymerization data disclosed in the examples of this patent), and the product obtained has an isotacticity of 94.4-98.8%. It is emphasized in this patent that the entire preparation process of the catalyst brings about an increase in catalytic activity of the catalyst (in relative to the level of catalyst at that time), an increase in isotacticity, and a delay of activity decay. However, nowhere does this patent disclose or imply (by comparison between examples and comparative examples) which effects would be brought about by the addition of the hydrogen-containing polysiloxane. In fact, the only two comparative examples given in this patent both point out that the stable release of activity of the catalyst is influenced (R is greater than 2 or less than 2) due to the different treatment of titanium tetrachloride, i.e. the different amount of titanium tetrachloride or the different treatment temperature. In other words, this patent is also silent about the effect of Si—H containing compound for improving the stable and even release of activity of the catalyst.

During the research and development of Z-N catalyst and the corresponding olefin polymerization, a serious problem regarding activity decay of the catalyst will be inevitably encountered, i.e., the activity of the catalyst will be significantly decreased after the reaction being carried out for 1.5-2 hours, which thereby greatly limit its use effect. After a large number of experiments and researches, the present inventors have unexpectedly found that the use of a Si—H containing organic silane compound can significantly delay the activity decay of the catalyst, so as to make the catalyst release its activity steadily and uniformly, and that the olefin polymer prepared by using the catalyst can have a significantly increased bulk density. Meanwhile, the catalyst also has high catalytic activity, good hydrogen response, and good stereospecificity.

SUMMARY OF THE INVENTION

An object of the present invention is to provide a catalyst component for olefin polymerization having high catalytic activity, good hydrogen response and good stereospecificity and being capable of releasing activity more evenly, and to provide a catalyst comprising the same.

Specifically, the present invention provides a catalyst component A for olefin polymerization, which is prepared by contacting a solid component (a) containing magnesium, titanium, halogen and an internal electron donor compound at least with an organosilicon compound (b), wherein the solid component (a) is prepared by contacting a magnesium compound, a titanium compound and an internal electron donor under certain conditions and the said organosilicon compound (b) is one or more selected from a Si—H functional group containing chainlike polysiloxane (b1) represented by formula ($I_x$), a cyclic polysiloxane (b2) represented by formula ($I_y$) and a Si—H functional group containing organosilicon compound (b3) represented by formula ($I_z$):

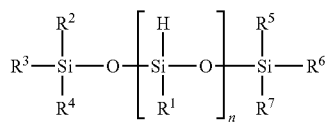
($I_x$)

In the formula ($I_x$), $R^1$-$R^7$, which are identical or different, independently of each other represent one selected from a linear or branched alkyl group having 1 to 12 carbon atoms, a cycloalkyl group having 3 to 10 carbon atoms, and an alkaryl group or a substituted or unsubstituted aryl group having 6 to 20 carbon atoms; the degree of polymerization n is an integer of 2 to 100;

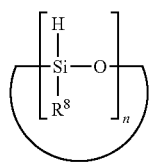
($I_y$)

In the formula ($I_y$), $R^8$ represents one selected from a linear or branched alkyl group having 1 to 12 carbon atoms, a cycloalkyl group having 3 to 10 carbon atoms, and an alkaryl group or a substituted or unsubstituted aryl group having 6 to 20 carbon atoms; the degree of polymerization n is an integer of 3 to 20;

$$HSiR^9{}_zR^{10}{}_{3-z} \quad (I_z)$$

In the formula ($I_z$), $R^9$ and $R^{10}$, which are identical or different, independently of each other represent one selected from a hydrogen atom, a halogen atom, a linear or branched saturated alkyl group having 1 to 12 carbon atoms, a cycloalkyl group having 3 to 10 carbon atoms, and an alkaryl group or a substituted or unsubstituted aryl group having 6 to 20 carbon atoms; $R^9$ and $R^{10}$ are not simultaneously hydrogen; z is an integer of 0 to 3.

The solid component (a) according to the present invention can be prepared by contacting a magnesium compound, a titanium compound and an internal electron donor under certain conditions. There are not particular limitations as to the amounts of the titanium compound, the magnesium compound and the internal electron donor used for preparing the solid component (a), and all of these compounds can be used in their conventional amounts in the art.

In one preferred embodiment, an alkoxy magnesium compound represented by formula (II) or a hydrate or an alcohol adduct thereof can be used as the magnesium compound for preparing the solid component (a), $$Mg(OR^{11})_{2-y}(OR^{12})_y \quad (II)$$

In the formula (II), $R^{11}$ and $R^{12}$, which are identical or different, independently of each other represent a linear or branched alkyl group having 1 to 8 carbon atoms, and $0 \leq y \leq 2$.

Preferably, in the alkoxy magnesium compound represented by the formula (II), $R^{11}$ and $R^{12}$ are selected from methyl, ethyl, propyl, isopropyl, butyl, isobutyl, n-hexyl, (2-ethyl)hexyl. More preferably, the alkoxy magnesium compound is $Mg(OEt)_{2-y}(OR^{12})_y$, wherein Et is ethyl, $R^{12}$ independently of each other represents methyl, ethyl, propyl, isopropyl, butyl, isobutyl, n-hexyl or (2-ethyl)hexyl, and $0.001 \leq y \leq 0.5$.

According to the present invention, in the alkoxy magnesium compound represented by the formula (II), the formula (II) only represents the formal compositional ratio of various alkoxy groups in the alkoxy magnesium compound, and does not represent the real structure of the alkoxy magnesium compound. For example, Mg(OEt)(OiPr), wherein Et represents ethyl and iPr represents isopropyl, only represents that the molar ratio of ethoxy group to isopropoxy group in the alkoxy magnesium compound is 1, which may refer to not only a mixture of diethoxy magnesium and diisopropoxy magnesium in a molar ratio of 1, but also an ethoxy isopropoxy magnesium compound, as well as even a mixture of the three compounds. It may refer to a mixture of alkoxy magnesium compounds having various structures, which, in its entirety, has a mole ratio of ethoxy group to isopropoxy group of 1.

In one specific embodiment, the titanium compound used for preparing the solid component (a) according to the present invention is a compound represented by formula (III), $$TiX_m(OR'')_{4-m} \quad (III)$$

In the formula (III), X is a halogen atom, R" is a hydrocarbon group having 1 to 20 carbon atoms, m is an integer of 0 to 4; wherein the halogen may be chlorine, bromine or iodine.

In one preferred embodiment, in the formula (III), X is a halogen atom, R" is an alkyl group having 1 to 5 carbon atoms. For example, this compound may be at least one selected from titanium tetrachloride, titanium tetrabromide, titanium tetraiodide, tetrabutoxy titanium, tetraethoxy titanium, triethoxy titanium monochloride, diethoxy titanium dichloride and ethoxy titanium trichloride. Preferably, the titanium compound is titanium tetrachloride.

In one specific embodiment, the internal electron donor compound used for preparing the solid component (a) according to the present invention is one or more selected from a compound represented by formula (IV),

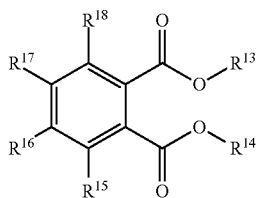
(IV)

In the formula (IV), $R^{13}$ and $R^{14}$, which are identical or different, independently of each other represent one selected from a linear or branched alkyl group having 1 to 12 carbon atoms, a cycloalkyl group having 3 to 10 carbon atoms, and an alkaryl group or a substituted or unsubstituted aryl group having 6 to 20 carbon atoms. $R^{15}$, $R^{16}$, $R^{17}$ and $R^{18}$ are all hydrogen; or three of them are hydrogen and the other one is a group selected from a halogen atom, a linear or branched alkyl group having 1 to 4 carbon atoms and a linear or branched alkoxy group having 1 to 4 carbon atoms.

In the present invention, the term "alkyl" includes linear or branched alkyl groups having 1 to 12, preferably 1 to 9, more preferably 1 to 4 carbon atoms; examples of which include: methyl, ethyl, n-propyl, isopropyl, n-butyl, sec-butyl, isobutyl, tert-butyl, n-pentyl, isopentyl, tert-pentyl, neopentyl, n-hexyl, n-heptyl, 2-ethyl hexyl, n-octyl, n-nonyl and n-decyl.

In the present invention, examples of the linear or branched alkoxy group having 1 to 4 carbon atoms may include: methoxy, ethoxy, n-propoxy, isopropoxy, n-butoxy group, sec-butoxy, isobutoxy and tert-butoxy.

In the present invention, examples of the cycloalkyl having 3 to 10 carbon atoms may include: cyclopropyl, cyclopentyl, cyclohexyl group, 4-methyl cyclohexyl, 4-ethyl cyclohexyl, 4-n-propyl cyclohexyl and 4-n-butyl cyclohexyl.

In the present invention, examples of the alkaryl group or substituted or unsubstituted aryl group having 6 to 20 carbon atoms may include: phenyl, 2-chlorophenyl, 3-chlorophenyl, 4-chlorophenyl, 2-bromophenyl, 3-bromophenyl, 4-bromophenyl, 4-methylphenyl, 4-ethylphenyl, 4-propylphenyl, 4-isopropyl phenyl, 4-n-butyl phenyl, 4-tert-butyl phenyl, 4-methoxy phenyl, and 4-ethoxy phenyl.

The internal electron donor used for preparing the solid component (a) according to the present invention is preferably at least one selected from diethyl phthalate, di-n-butyl phthalate, diisobutyl phthalate, dihexyl phthalate, di-heptyl phthalate, di-n-octyl phthalate, diisooctyl phthalate. It is particularly preferably at least one selected from diethyl phthalate, di-n-butyl phthalate, diisobutyl phthalate, di-n-octyl phthalate, and diisooctyl phthalate.

In the present invention, the solid component (a) can be prepared by using a conventional method for preparing an olefin catalyst component in the art. For example, the solid component (a) according to the present invention can be prepared by using the following method.

A magnesium compound, e.g., the above-mentioned alkoxy magnesium compound, is suspended in an inert diluent to form a suspension, and then the suspension is brought into contact with the above-mentioned titanium compound and the internal electron donor to obtain a solid dispersion system, which is often called as a mother liquor. The mother liquor is filtered, and the resulting solid is subjected to contact treatment by suspending in a solution containing titanium tetrachloride, which is generally called as titanium treatment. Thereafter, the suspension is filtered, and the resulting solid is washed to give the solid component (a) of the present invention.

As to specific examples of alkoxy magnesium compound, please refer to the foregoing contents in this part. The preferred is diethoxy magnesium or a mixture of diethoxy magnesium and other alkoxy magnesium compound(s). The alkoxy magnesium compound can be prepared by using a well known method in the art, for example, the preparation method, as disclosed in the patent CN101906017A, of reacting metallic magnesium with fatty alcohols in the presence of a small amount of iodine.

In the above method, the inert diluent used for forming the mother liquor can be at least one selected from hexane, heptane, octane, decane, benzene, toluene and xylene. The individual amounts of various components used for forming the mother liquor, per mole of magnesium, are as follows: the amount of the titanium compound is 0.5 to 100 moles, preferably 1 to 50 moles; the amount of the inert diluent is usually 0.5 to 100 moles, preferably 1 to 50 moles; the amount of the internal electron donor compound is usually 0.005 to 10 moles, preferably 0.01-1 moles. In the course of forming the mother liquor, the contact temperature of various components is usually −40~200° C., preferably −20~150° C., and the contact time is usually from 1 minute to 20 hours, preferably 5 minutes to 8 hours.

In the above method, to the solution containing titanium tetrachloride used for titanium treatment, an inert diluent is optionally added, which is, for example, at least one selected from hexane, heptane, octane, decane, benzene, toluene and xylene. In the solution containing titanium tetrachloride used, the individual amounts of various components, per mole of magnesium, are as follows: the amount of the titanium compound is 0.5 to 100 moles, preferably 1 to 50 moles; the amount of the inert diluent is usually 0 to 100 moles, preferably 0 to 50 moles. The titanium treatment is repeated for 0 to 10 times, preferably 1 to 5 times. Moreover, in the course of the titanium treatment, the above internal electron donor compound is optionally added, wherein the amount of the internal electron donor is usually 0.005 to 10 moles, preferably 0.01 to 1 mol.

The titanium treatment temperature is usually 0~200° C., preferably 30~150° C.; and the contact time is usually from 1 minute to 20 hours, preferably from 5 minutes to 6 hours.

In the solid component (a) according to the present invention, the amount of titanium atoms is 1.0-8.0 wt %, preferably 1.6-6.0 wt %; the amount of magnesium atoms is 10-70 wt %, preferably 15-40 wt %; the amount of halogen atoms is 20-86 wt %, preferably 36-80 wt %; and the total amount of the internal electron donor compound is 2-30 wt %, preferably 3-20 wt %.

In the catalyst component (A) for olefin polymerization according to the present invention, the organosilicon compound b is one or more selected from a Si—H functional group containing chainlike polysiloxane (b1) represented by formula ($I_x$), a cyclic polysiloxane (b2) represented by formula ($I_y$) and a Si—H functional group containing organosilicon compound (b3) represented by formula ($I_z$).

As to the chainlike polysiloxane (b1) represented by the formula ($I_x$), preferably, $R^1$ is a linear or branched alkyl group having 1 to 6 carbon atoms, a cycloalkyl group or an aryl group, and $R^2$-$R^7$ are methyl. In a preferred embodiment, examples of the compound represented by the formula ($I_x$) include 1,1,1,3,5,7,7,7-octamethyltetrasiloxane (n=2), polymethylhydrosiloxane, polyethylhydrosiloxane, polyphenylhydrosiloxane, polycyclohexylhydrosiloxane. The polymethylhydrosiloxane is also called as hydrogen-containing silicone oil. It has different number average molecular weight and viscosity as its average degree of polymerization (n value) varies. Despite all that, all the polymethylhydrogensiloxanes have the function and effect as expected in the present invention and thus all of them are the preferred (b1) of the present invention. For example, the polymethylhydrosiloxanes having number average molecular weights Mn=1700-3200 (n=29-55, viscosity 12-45 cSt, Sigma-Aldrich Co.) and Mn≈390 (n≈6, Sigma-Aldrich Co.) both are the preferred (b1) of the present invention.

As to the cyclic polysiloxane (b2) represented by the formula ($I_y$), $R^8$ is preferably a linear or branched alkyl group having 1 to 12 carbon atoms, and n is preferably an integer of 3 to 8. In one preferred embodiment, examples of the compound represented by the formula ($I_y$) include tetraethylcyclotetrasiloxane, tetramethylcyclotetrasiloxane, pentamethylcyclopentasiloxane and the like.

As to the Si—H functional group containing organosilicon compound (b3) represented by the formula ($I_z$), preferably, $R^9$ and $R^{19}$ are one selected from a hydrogen atom, a linear or branched saturated alkyl group, a cycloalkyl group and a substituted or unsubstituted aryl group having 1 to 12 carbon atoms. In one preferred embodiment, examples of the compound represented by the formula ($I_z$) include triethylsilane, tripropylsilane, tributyl silane, tripentyl silane, trihexyl silane, triisopropylsilane, triphenyl silane, diphenyl silane, dipropyl silane, dibutyl silane, dipentyl silane, dihexyl silane, diisopropyl silane, diisobutyl silane, diisopentyl silane, diisohexyl silane and the like.

The above compounds (b1) to (b3) can be used alone or in mixture. The compounds represented by the formula ($I_x$) or the formula ($I_y$) used in the present invention may be commercially available, or may be prepared by chemical reactions such as alkylation, condensation from the corresponding precursor compounds. The compounds represented by the formula ($I_z$) used in the present invention may be commercially available, or, similarly, may be prepared by alkylation reaction from the corresponding precursor compounds.

In the present invention, the catalyst component (A) for olefin polymerization can be prepared by contacting the solid component (a) with the organosilicon compound (b) through various methods. For example, the catalyst component (A) for olefin polymerization according to the present invention can be prepared by using the following method I and method II.

Method I: the catalyst component (A) is prepared by contacting the organosilicon compound (b) with the solid component (a) as has been already prepared. The solid component (a) as prepared is dispersed in an inert diluent, and is subsequently brought into reaction by contacting with an organosilicon compound (b). After completion of the reaction, the reaction product is filtered, washed with an inert alkane solvent such as hexane, heptane and the like, filtered and dried to give the catalyst component (A) for olefin polymerization.

In Method I, there is not a particular limitation as to the inert diluent used, as long as it helps to bring the solid component (a) into sufficient contact with the organosilicon compound (b). The inert diluent is preferably alkanes, cycloalkanes, aromatic hydrocarbons, halogenated alkanes, halogenated aromatic hydrocarbon solvents or silicone oils, more preferably at least one selected from hexane, cyclohexane, heptane, octane, decane, benzene, toluene, xylene, chlorobenzene and dichlorobenzene. There is not a particular limitation as to the amount of the inert diluent used. Preferably, the amount is 2 to 100 ml of inert diluent per gram of the solid component (a), and more preferably 5 to 50 ml of inert diluent per gram of the solid component (a). In this method, the solid component (a) and the organosilicon compound (b) can be brought into contact at a temperature ranging from −20° C. to 150° C., preferably from −10° C. to 120° C., and more preferably from 0° C. to 110° C. The contact time is from 10 minutes to 5 hours, preferably from 30 minutes to 3 hours. In this method, there are not particular limitations as to the amounts of the solid component (a) and of the organosilicon compound (b). Preferably, the molar ratio of titanium atom in the solid component (a) to the Si—H functional group in the organosilicon compound (b) is 1:0.1-1:10, preferably 1:0.2-1:5.

Method II: the organosilicon compound (b) is added during the preparation of the solid component (a) to effect the contacting of the solid component (a) with the organosilicon compound (b), to thereby obtain the catalyst component (A) for olefin polymerization. According to the aforesaid method for preparing the solid component (a), the organosilicon compound (b) may be added at any occasion during the preparation of the solid component (a), and in general is added at the following occasions:

First, in the aforesaid method for preparing the solid component (a), the organosilicon compound (b) is added into the solid suspension, i.e., the mother liquor, formed after contacting magnesium compound and titanium compound, to effect the contact reaction, and then after the completion of the reaction the titanium treatment in the aforesaid method for preparing the solid component (a) is carried out, followed by filtering, washing and drying to obtain the catalyst component (A) for olefin polymerization.

Second, in the aforesaid method for preparing the solid component (a), the organosilicon compound (b) is added during the titanium treatment after filtering the mother liquor, more preferably during the final titanium treatment step to effect the contact reaction, and then after the completion of the reaction, the reaction solution is subjected to filtering, washing and drying to obtain the catalyst component (A) for olefin polymerization.

Third, in the aforesaid method for preparing the solid component (a), the organosilicon compound (b) is added during the washing course after completion of the titanium treatment to effect the contact reaction, and thereafter the reaction solution is subjected to filtering, washing and drying to obtain the catalyst component (A) for olefin polymerization. Although, in principle, the organosilicon compound (b) can be added at any of the aforesaid three occasions, it is more favorable to add the organosilicon compound (b) at the aforesaid second and third occasions in order to form a more perfect solid component (a).

In Method II, the organosilicon compound (b) can be brought into contact with the solid at a temperature in the range of −20° C. to 150° C., preferably in the range of −10° C. to 120° C., and more preferably in the range of 0° C. to 110° C. The contact time is 10 minutes to 10 hours, preferably 30 minutes to 5 hours. There is not a particular limitation as to the amount of the organosilicon compound (b). Preferably, the organosilicon compound (b) is used in such an amount that the molar ratio of the Si—H functional group in the organosilicon compound (b) to the used magnesium compound is 1:1-1:100, preferably 1:5-1:50.

In the catalyst component (A) for olefin polymerization according to the present invention, the content of titanium atoms is 1.0-8.0 wt %, preferably 1.6-4.0 wt %; the content of magnesium atoms is 10-70 wt %, preferably 15-40 wt %; the content of halogen atoms is 20-86 wt %, preferably 36-80%; the content of silicon atoms is 0.01-2 wt %, preferably 0.02-0.5 wt %; and the total content of internal electron donor compounds is 2-30 wt %, preferably 3-20 wt %.

The catalyst for olefin polymerization according to the present invention is used for the polymerization of olefins represented by the general formula $CH_2\!=\!CHR$, wherein R is hydrogen or an alkyl group having 1 to 6 carbon atoms. The catalyst comprises a reaction product of: the catalyst component (A) for olefin polymerization; an organoaluminum compound B as cocatalyst; optionally, an external electron donor compound C.

In the above-mentioned catalyst for olefin polymerization, the organoaluminum compound may be various organoaluminum compounds capable of being used as cocatalyst of Ziegler-Natta type catalyst that are commonly used in the field of olefin polymerization. In one preferred embodiment, the organoaluminum compound may be a compound represented by formula (V):

$$AlR^{19}{}_w X^{19}{}_{3-w} \qquad (V)$$

In the formula (V), $R^{19}$ is hydrogen, an alkyl group having 1 to 20 carbon atoms or an aryl group having 6 to 20 carbon atoms, $X^{19}$ is halogen, w is an integer of 1 to 3. Specific examples of the organoaluminum compound may be at least one selected from trimethylaluminum, triethylaluminum, triisobutylaluminum, trioctylaluminum, diethylaluminum hydride, diisobutylaluminum hydride, diethylaluminum chloride, diisobutylaluminum chloride, sesquiethylaluminum chloride and ethylaluminum dichloride.

The amount of the organoaluminum compound may be a conventional amount in this field. Generally, the molar ratio of aluminum in the organoaluminum compound to titanium in the catalyst is 5-5000:1; preferably, the molar ratio of aluminum in the organoaluminum compound to titanium in the catalyst is 20-1000:1; more preferably, the molar ratio of aluminum in the organoaluminum compound and to titanium in the catalyst is 50-500:1.

There are not particular limitations as to the type and amount of the external electron donor in the catalyst for olefin polymerization of the present invention. In one preferred embodiment, the molar ratio of aluminum in the organoaluminum compound to the external electron donor compound is 0.1-500:1, preferably 1-300:1, more preferably 3-100:1.

In the catalyst for olefin polymerization according to the present invention, the external electron donor component may be various external electron donors as well known to those skilled in the art. In one preferred embodiment of the present invention, an organosilicon compound represented by formula (VI) is used:

$$R^{1\prime\prime}{}_{m\prime\prime} - R^{2\prime\prime}{}_{n\prime\prime} Si(OR^{3\prime\prime})_{4-m\prime\prime-n\prime\prime} \qquad (VI)$$

wherein, $R^{1\prime\prime}$ and $R^{2\prime\prime}$, which are identical or different, represent one selected from a halogen atom, a hydrogen atom, an alkyl group having 1 to 20 carbon atoms, a cycloalkyl group having 3 to 20 carbon atoms, an aryl group having 6 to 20 carbon atoms and a haloalkyl group having 1 to 20 carbon atoms; $R^{3\prime\prime}$ is selected from an alkyl group having 1 to 20 carbon atoms, a cycloalkyl group having 3 to 20 carbon atoms, an aryl group having 6 to 20 carbon atoms and a haloalkyl group having 1 to 20 carbon atoms; m" and n" are each an integer of 0 to 3, and m"+n"<4.

Specific examples of suitable organosilicon compounds include trimethyl methoxysilane, diisopropyl dimethoxysilane, diisobutyl dimethoxysilane, isopropylisobutyl dimethoxysilane, di-t-butyl dimethoxysilane, tert-butylmethyl dimethoxysilane, t-butylethyl dimethoxysilane, tert-butyl-propyl dimethoxysilane, tert-butylisopropyl dimethoxysilane, cyclohexylmethyl dimethoxysilane, dicyclohexyl dimethoxysilane, cyclohexyl-tert-butyl dimethoxysilane, cyclopentylmethyl dimethoxysilane, cyclopentylethyl dimethoxysilane, dicyclopentyl dimethoxysilane, cyclopentylcyclohexyl dimethoxysilane, bis(2-methylcyclopentyl)dimethoxysilane, diphenyl dimethoxysilane, diphenyl diethoxysilane, phenyl triethoxysilane, methyl trimethoxysilane, methyl triethoxysilane, ethyl trimethoxysilane, propyl trimethoxysilane, isopropyl trimethoxysilane, butyl trimethoxysilane, butyl triethoxysilane, iso-butyl trimethoxysilane, pentyl trimethoxysilane, isopentyl trimethoxysilane, cyclopentyl trimethoxysilane, cyclohexyl trimethoxysilane, diphenyl dimethoxysilane, diphenyl diethoxysilane, phenyl trimethoxysilane, phenyl triethoxysilane, n-propyl trimethoxysilane, vinyl trimethoxysilane, tetramethoxysilane, tetraethoxysilane, tetrabutoxysilane and the like. These organosilicon compounds may be used alone, or in combination of two or more of them.

More preferably, the compound useful as the external electron donor is at least one selected from dicyclopentyl dimethoxysilane, diisopropyl dimethoxysilane, diisobutyl dimethoxysilane, cyclohexylmethyl dimethoxysilane, diphenyl dimethoxysilane, methyltert-butyl dimethoxysilane, and tetraethoxysilane.

In a particularly preferred embodiment, in order to prepare a highly isotactic polymer, for example, dicyclopentyl dimethoxysilane can be used as the external electron donor compound. In order to prepare a high melt index polymer, for example, tetraethoxysilane can be used as the external electron donor compound.

The present invention also relates to a process for olefin polymerization, which comprises, under olefin polymerization conditions, contacting one or more olefins with the catalyst, wherein at least one of the olefins is an olefin represented by the formula $CH_2\!=\!CHR$, wherein R is hydrogen or an alkyl group having 1 to 6 carbon atoms.

The olefin polymerization process of the present invention can be used for homopolymerization of olefins, and can also be used for copolymerization of a variety of olefins. Specific examples of α-olefin represented by the formula $CH_2\!=\!CHR$ include: ethylene, propylene, 1-n-butene, 1-n-pentene, 1-n-hexene, 1-n-octene and 4-methyl-1-pentene. Preferably, the olefin represented by the formula $CH_2\!=\!CHR$ is ethylene, propylene, 1-butene.

In the olefin polymerization process of the present invention, the olefin polymerization conditions may be conventional conditions in this field. Generally, the olefin polymerization conditions include: temperature of 0-150° C., time of 0.1 to 5 hours, and pressure of 0.01-10 MPa. Preferably, the olefin polymerization conditions include: temperature of 60-130° C., time of 0.5 to 3 hours, and pressure of 0.5-5 MPa. The amount of the catalyst can be the amount of various catalysts in the prior art.

MODE OF CARRYING OUT THE PRESENT INVENTION

The present invention is further described in detail by referring to the following examples. The following examples are only preferred embodiments of the present invention, and the scope of the present invention is not limited to these examples. Any change or variation that can be easily accomplished by a person skilled in the art within the technical scope disclosed in the present disclosure is embraced within the protection scope of the present invention. The scope of the present invention is proposed in the claims.

Unless specified otherwise, the organosilicon compounds used in the following examples were all purchased from ACROS or Sigma-Aldrich Co.; anhydrous $MgCl_2$ was purchased from Qinghai Beichen Science and Technology Co., Ltd.; $TiCl_4$ was purchased from Xingtai Non-Ferrous Smelter; the organosilicon compound as external electron donor and the organoaluminum compound as cocatalyst both were purchased from Nanjing Tonglian Chemical Industry Co., Ltd.

In the following examples, the contents of titanium atoms in the solid component (a) and the catalyst component (A) for olefin polymerization were measured by using a 721 spectrophotometer purchased from UNCOMMON (Tianjin) Science and Technology Development Co., Ltd.; the melt index of polymer was measured by using a XRZ-00 melt flow rate tester purchased from Changchun Shinco Experimental Instruments and Equipments Co., Ltd., in accordance with the method specified in GB/T3682-2000.

In the following examples, the content of silicon atoms was measured according to the following method:

At first, the relative contents of Si and Ti atoms in the catalyst were measured by using an Axios-Advanced X-ray fluorescence spectrometer purchased from Dutch PANalytical Co., and then the content of Si atoms was calculated in virtue of the above-mentioned content of Ti atoms that was measured by the spectrometer according to the following formula:

> the content of Si atoms=(the content of Ti atoms×the relative content of Si atoms)÷the relative content of Ti atoms.

In the following examples, the isotacticity of polymer was measured according to the following method: 2 g of dried polymer sample was extracted by using boiling heptane in an extractor for 6 hours, the residue was dried till constant weight, and the isotacticity was calculated according to the following formula:

> Isotacticity (%)=mass of the polymer after extraction/2×100.

Bulk density of polymer: polymer powders dropped from a hopper to a 100 mL cylindrical vessel, the mass in grams of the polymer in the vessel was weighed, and bulk density of the polymer was calculated according to the following formula:

> Bulk density (BD)=m/100 g/cm³.

PREPARATORY EXAMPLE

Preparation of Alkoxy Magnesium:

In a 1 L reactor equipped with a stirrer, a reflux condenser, a thermometer and a constant pressure addition funnel, which had been sufficiently purged with nitrogen gas, 550 mL of ethanol, 10 mL of isopropyl alcohol, and 0.68 g of iodine were added and dissolved. The reaction system was heated with stirring until reaching its reflux temperature. Then, 32 g of magnesium powder was added successively. The reaction was carried out until no discharge of hydrogen gas, thereafter the reaction product was washed, filtered and dried to give 147 g of alkoxy magnesium having a bulk density of 0.25 g/cm³, and an average particle diameter (D50) of 47.0 μm.

Example 1

Preparation of Solid Component (a1):

10 g of the alkoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 40 mL of toluene and 60 mL of titanium tetrachloride were added, and then the formulated suspension was added. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. with stirring to carry out treatment for 1 hour (titanium treatment). The treatment was repeated for three times, and thereafter the liquid was filtered off and the resulting solid was washed with 120 mL of n-hexane at 50° C. for 4 times. After filtering off the liquid, the resulting solid was dried to give a solid component (a1) of the present invention. The resulting solid component (a1) had a content of titanium of 2.4 wt %.

Preparation of Catalyst Component (A1) for Olefin Polymerization:

In a 300 mL reaction kettle, 10 g of the solid component (a1) and 80 mL of n-heptane were added, and the mixture was cooled down to 10° C., to which was then added 3 mL of polymethylhydrosiloxane (n≈35) with stirring to form a suspension. The suspension was heated up to 70° C., kept at this temperature for 2 hours, and then the liquid was filtered off thoroughly. The resulting solid was washed with 120 mL of n-heptane at 50° C. for 4 times, the liquid was filtered off, and the resulting product was dried to give a catalyst component (A1) for olefin polymerization. The catalyst component (A1) for olefin polymerization had a content of titanium atoms of 2.1 wt %, and a content of silicon atoms of 0.060 wt %.

Preparation of Polyolefin:

In a 5 L autoclave which had been sufficiently purged with gas phase propylene, 5 mL of a solution of triethylaluminum in hexane (concentration of triethylaluminum: 0.5 mol/L), 1 mL of a solution of cyclohexylmethyl dimethoxysilane (CHMMS) in hexane (concentration of CHMMS: 0.1 mol/L), 10 mL of anhydrous hexane and about 6-10 mg of the catalyst component (A1) for olefin polymerization as above prepared were added at room temperature. The autoclave was closed, to which 0.9 standard liters (NL) of hydrogen gas and 2 L of liquid propylene were introduced. With stirring, the temperature was raised up to 70° C. within 15 minutes. After polymerization at 70° C. for 1-3 hours, the stirring was stopped, the remnant propylene monomer was removed, and the resulting product was collected to give a polymer P.

The results as to the polymerization activity of the catalyst component (A1) for olefin polymerization, the melt index (MI) of the polymer, the isotacticity (II) of the polymer and the bulk density (BD) of the polymer were shown in Table 1. The polymerization activity of the catalyst was calculated according to the following formula:

> Polymerization activity=mass of the polymer P (kg)/mass (g) of the catalyst component (A1) for olefin polymerization.

Comparative Example 1

The solid component (a1) as prepared in Example 1 was used in place of the catalyst component (A1) for olefin polymerization to carry out the polymerization according to the preparation process of polyolefin described in Example 1. The results as to the polymerization activity of the solid component (a1), the melt index (MI) of the polymer, the isotacticity (II) of the polymer and the bulk density (BD) of the polymer were shown in Table 1.

Example 2

Preparation of Catalyst Component (A2) for Olefin Polymerization:

In a 300 mL reaction kettle, 10 g of the solid component (a1)) prepared in Example 1 and 80 mL of n-hexane were added, and the mixture was cooled down to 0° C., to which was then added 3 mL of polymethylhydrosiloxane (n≈6) with stirring to form a suspension. The suspension was heated up to 60° C., kept at this temperature for 2 hours, and then the liquid was filtered off thoroughly. The resulting solid was washed with 120 mL of n-hexane at 50° C. for 4 times, the liquid was filtered off, and the resulting product was dried to give a catalyst component (A2) for olefin polymerization. The catalyst component (A2) for olefin polymerization had a content of titanium atoms of 2.1 wt %, and a content of silicon atoms of 0.090 wt %.

Preparation of Polyolefin:

A2 was used in place of A1 to carry out the polymerization according to the preparation process of polyolefin described in Example 1. The results as to the polymerization activity of the catalyst component (A2) for olefin polymerization, the melt index (MI) of the polymer, the isotacticity (II) of the polymer and the bulk density (BD) of the polymer were shown in Table 1.

Example 3

Preparation of catalyst component (A3) for olefin polymerization:

In a 300 mL reaction kettle, 10 g of the solid component (a1)) prepared in Example 1 and 100 mL of n-hexane were added with stirring to form a suspension. The suspension was heated up to 60° C., to which then 0.5 mL of polymethylhydrosiloxane (n≈35) was added, and kept at this temperature for 3 hours. Then the liquid was filtered off thoroughly. The resulting solid was washed with 120 mL of n-hexane at 50° C. for 4 times, the liquid was filtered off, and the resulting product was dried to give a catalyst component (A3) for olefin polymerization. The catalyst component (A3) for olefin polymerization had a content of titanium atoms of 2.0 wt %, and a content of silicon atoms of 0.042 wt %.

Preparation of Polyolefin:

A3 was used in place of A1 to carry out the polymerization according to the preparation process of polyolefin described in Example 1. The results as to the polymerization activity of the catalyst component (A3) for olefin polymerization, the melt index (MI) of the polymer, the isotacticity (II) of the polymer and the bulk density (BD) of the polymer were shown in Table 1.

Example 4

Preparation of Catalyst Component (A4) for Olefin Polymerization:

In a 300 mL reaction kettle, 10 g of the solid component (a1)) prepared in Example 1 and 100 mL of n-heptane were added, and the mixture was cooled down to 0° C., to which was then added 3 mL of tetramethylcyclotetrasiloxane with stirring to form a suspension. The suspension was heated up to 70° C., kept at this temperature for 2 hours, and then the liquid was filtered off thoroughly. The resulting solid was washed with 120 mL of n-heptane at 50° C. for 4 times, the liquid was filtered off, and the resulting product was dried to give a catalyst component (A4) for olefin polymerization. The catalyst component (A4) for olefin polymerization had a content of titanium atoms of 2.1 wt %, and a content of silicon atoms of 0.080 wt %.

Preparation of Polyolefin:

A4 was used in place of A1 to carry out the polymerization according to the preparation process of polyolefin described in Example 1. The results as to the polymerization activity of the catalyst component (A4) for olefin polymerization, the melt index (MI) of the polymer, the isotacticity (II) of the polymer and the bulk density (BD) of the polymer were shown in Table 1.

Example 5

Preparation of Catalyst Component (A5) for Olefin Polymerization:

In a 300 mL reaction kettle, 10 g of the solid component (a1)) prepared in Example 1 and 100 mL of n-hexane were added with stirring to form a suspension. The suspension was heated up to 60° C., to which 3 mL of tetraethylcyclotetrasiloxane was added, and kept at this temperature for 2 hours. Then the liquid was filtered off thoroughly. The resulting solid was washed with 120 mL of n-hexane at 50° C. for 4 times, the liquid was filtered off, and the resulting product was dried to give a catalyst component (A5) for olefin polymerization. The catalyst component (A5) for olefin polymerization had a content of titanium atoms of 2.1 wt %, and a content of silicon atoms of 0.075 wt %.

Preparation of Polyolefin:

A5 was used in place of A1 to carry out the polymerization according to the preparation process of polyolefin described in Example 1. The results as to the polymerization activity of the catalyst component (A5) for olefin polymerization, the melt index (MI) of the polymer, the isotacticity (II) of the polymer and the bulk density (BD) of the polymer were shown in Table 1.

Example 6

Preparation of Catalyst Component (A6) for Olefin Polymerization:

In a 300 mL reaction kettle, 10 g of the solid component (a1)) prepared in Example 1 and 70 mL of n-hexane were added, and the mixture was cooled down to 0° C., to which was then added 3 mL of pentamethylcyclopentasiloxane with stirring to form a suspension. The suspension was heated up to 60° C., kept at this temperature for 2 hours, and then the liquid was filtered off thoroughly. The resulting solid was washed with 120 mL of n-hexane at 50° C. for 4 times, the liquid was filtered off, and the resulting product was dried to give a catalyst component (A6) for olefin polymerization. The catalyst component (A6) for olefin polymerization had a content of titanium atoms of 2.0 wt %, and a content of silicon atoms of 0.060 wt %.

Preparation of Polyolefin:

A6 was used in place of A1 to carry out the polymerization according to the preparation process of polyolefin described in Example 1. The results as to the polymerization activity of the catalyst component (A6) for olefin polymerization, the melt index (MI) of the polymer, the isotacticity (II) of the polymer and the bulk density (BD) of the polymer were shown in Table 1.

Example 7

Preparation of Catalyst Component (A7) for Olefin Polymerization:

In a 300 mL reaction kettle, 10 g of the solid component (a1)) prepared in Example 1 and 100 mL of n-hexane were added with stirring to form a suspension. The suspension was heated up to 60° C., to which then 0.5 mL of tetramethylcyclotetrasiloxane was added, and kept at this temperature for 3 hours. Then the liquid was filtered off thoroughly. The resulting solid was washed with 120 mL of n-hexane at 50° C. for 4 times, the liquid was filtered off, and the resulting product was dried to give a catalyst component (A7) for olefin polymerization. The catalyst component (A7) for olefin polymerization had a content of titanium atoms of 2.2 wt %, and a content of silicon atoms of 0.032 wt %.

Preparation of Polyolefin:

A7 was used in place of A1 to carry out the polymerization according to the preparation process of polyolefin described in Example 1. The results as to the polymerization activity of the catalyst component (A7) for olefin polymerization, the melt index (MI) of the polymer, the isotacticity (II) of the polymer and the bulk density (BD) of the polymer were shown in Table 1.

Example 8

Preparation of Catalyst Component (A8) for Olefin Polymerization:

10 g of diethoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 40 mL of toluene and 60 mL of titanium tetrachloride were added, and then the formulated suspension was added. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. to carry out treatment with stirring for 1 hour, and then the liquid was filtered off. The treatment was repeated for two times. Thereafter, a mixture of 120 mL of toluene and 30 mL of titanium tetrachloride was added, and heated up to 110° C., to which 2.0 mL of polymethylhydrosiloxane (n≈35) was added with stirring. The mixture was kept at this temperature to carry out treatment with stirring for 1 hour, and then the liquid was filtered off. The resulting solid was washed with 120 mL of n-hexane at 50° C. for 4 times, and after filtering off the liquid, the resulting solid was dried to give a catalyst component (A8) for olefin polymerization. The catalyst component (A8) for olefin polymerization had a content of titanium atoms of 2.9 wt %, and a content of silicon atoms of 0.125 wt %.

Preparation of Polyolefin:

A8 was used in place of A1 to carry out the polymerization according to the preparation process of polyolefin described in Example 1. The results as to the polymerization activity of the catalyst component (A8) for olefin polymerization, the melt index (MI) of the polymer, the isotacticity (II) of the polymer and the bulk density (BD) of the polymer were shown in Table 1.

Example 9

Preparation of Catalyst Component (A9) for Olefin Polymerization:

10 g of diethoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 30 mL of toluene and 120 mL of titanium tetrachloride were added. Then the formulated suspension was added. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. to carry out treatment with stirring for 1 hour, and then the liquid was filtered off. The treatment was repeated for three times. The resulting solid was washed with 120 mL of n-hexane at 50° C. for 2 times. Then, 120 ml of hexane was added, and heated up to 60° C., to which 3 mL of polymethylhydrosiloxane (n≈35) was added with stirring, and kept at this temperature for 2 hours, and then the liquid was filtered off. The resulting solid was washed with 120 mL of n-hexane at 50° C. for 2 times, and after filtering off the liquid, the resulting solid was dried to give a catalyst component (A9) for olefin polymerization. The catalyst component (A9) for olefin polymerization had a content of titanium atoms of 2.0 wt %, and a content of silicon atoms of 0.081 wt %.

Preparation of Polyolefin:

A9 was used in place of A1 to carry out the polymerization according to the preparation process of polyolefin described in Example 1. The results as to the polymerization activity of the catalyst component (A9) for olefin polymerization, the melt index (MI) of the polymer, the isotacticity (II) of the polymer and the bulk density (BD) of the polymer were shown in Table 1.

Comparative Example 2

Preparation of Catalyst Component D1 for Olefin Polymerization:

In a 300 mL reaction kettle, 10 g of the solid component (a1)) prepared in Example 1 and 80 mL of n-heptane were added, and the mixture was cooled down to 10° C., to which was added 3 mL of polydimethylsiloxane (viscosity: 100 centistokes, Qingdao Xingye Silicone New Material Co., Ltd.) with stirring to form a suspension. The suspension was heated up to 70° C., kept at this temperature for 2 hours, and then the liquid was filtered off thoroughly. The resulting solid was washed with 120 mL of n-heptane at 50° C. for 4 times, the liquid was filtered off, and the resulting product was dried to give a catalyst component D1 for olefin polymerization. The catalyst component D1 for olefin polymerization had a content of titanium atoms of 2.3 wt %.

Preparation of Polyolefin:

D1 was used in place of A1 to carry out the polymerization according to the preparation process of polyolefin described in Example 1. The results as to the polymerization activity of the catalyst component D1 for olefin polymerization, the melt index (MI) of the polymer, the isotacticity (II) of the polymer and the bulk density (BD) of the polymer were shown in Table 1.

Example 10

Liquid Phase Bulk Polymerization of 1-Butene:

In a 2 L autoclave which had been sufficiently purged with 1-butene, 2 mL of a solution of triethylaluminum in hexane (concentration of triethylaluminum: 0.5 mmol/mL), 0.5 mL of a solution of diisopropyl dimethoxysilane in hexane (concentration: 0.1 mmol/mL), 10 mL of anhydrous hexane and 10 mg of the catalyst component (A1) for olefin polymerization prepared in Example 1 were added at room temperature. The autoclave was closed, to which 2 standard liters (NL) of hydrogen gas and 350 g of liquid 1-butene were introduced. With stirring, the temperature was raised up to 60° C. within 15 minutes. After polymerization at 60° C. for 1-3 hours, the stirring was stopped, the remnant 1-butene monomer was removed, and the resulting product was collected as a polymer.

The results as to the 1-butene polymerization activity of the catalyst component (A1) for olefin polymerization, and the melt index (Ml) of the polymer were shown in Table 1.

Comparative Example 3

The solid component (a1) prepared in Example 1 was used in place of the catalyst component (A1) for olefin polymerization to carry out the polymerization according to the preparation process of polyolefin described in Example 10. The results as to the 1-butene polymerization activity of the solid component (a1), and the melt index (Ml) of the polymer were shown in Table 1.

TABLE 1

| | Polymerization activity (Kg · PP/g · Cat) | | | MI | II | BD |
|---|---|---|---|---|---|---|
| | 1 hour | 2 hours | 3 hours | (g/10 min) | (%) | g/cm³ |
| Example 1: A1 | 44 | 85 | 117 | 6.2 | 98.3 | 0.44 |
| Example 2: A2 | 45 | 87 | 115 | 5.7 | 98.5 | 0.44 |
| Example 3: A3 | 43 | 77 | 105 | 5.7 | 98.6 | 0.44 |
| Example 4: A4 | 41 | 81 | 107 | 6.1 | 98.3 | 0.44 |
| Example 5: A5 | 43 | 78 | 110 | 5.8 | 98.8 | 0.45 |
| Example 6: A6 | 42 | 75 | 103 | 5.4 | 98.3 | 0.44 |
| Example 7: A7 | 42 | 74 | 105 | 5.7 | 98.6 | 0.44 |
| Example 8: A8 | 48 | 91 | 118 | 8.0 | 97.6 | 0.43 |
| Example 9: A9 | 50 | 88 | 114 | 5.2 | 98.5 | 0.44 |
| Comparative Example 1: a1 | 45 | 69 | 87 | 5.4 | 98.6 | 0.42 |
| Comparative Example 2: D1 | 45 | 68 | 85 | 5.2 | 98.7 | 0.42 |
| Example 10: A1 | 14 | 25 | 32 | 1.1 | — | — |
| Comparative Example 3: a1 | 15 | 22 | 29 | 0.9 | — | — |

Notes:
"1, 2 and 3 hours" in the table refer to that the olefin polymerization reaction, in three experiments, had been carried out for 1 hour, 2 hours and 3 hours respectively.
MI, II (isotacticity) and BD values in the table were all the measured results of polymer samples taken from one hour polymerization in various examples.

As can be seen from the data in Table 1, the catalyst for olefin polymerization, which was prepared by using the catalyst component for olefin polymerization that had been treated by contacting with the Si—H containing organosilicon compound (b1) or (b2), could release activity more steadily and evenly, have better hydrogen response and significantly improved total activity, and could result in polymer having increased bulk density, as compared with the catalyst for olefin polymerization which was prepared by using an untreated catalyst component for olefin polymerization.

Example 11

Preparation of Solid Component (a1):

10 g of the alkoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 40 mL of toluene and 60 mL of titanium tetrachloride were added, and then the formulated suspension was added. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. to carry out treatment with stirring for 1 hour (titanium treatment). The treatment was repeated for three times. Thereafter, the liquid was filtered off, and the resulting solid was washed with 120 mL of n-hexane at 50° C. for 4 times. After filtering off the liquid, the resulting solid was dried to give a solid component (a1) of the present invention. The resulting solid component (a1) had a content of titanium of 2.4 wt %.

Preparation of Catalyst Component (a11) for Olefin Polymerization:

In a 300 mL reaction kettle, 10 g of the solid component (a1) and 80 mL of n-heptane were added with stirring to form a suspension. The suspension was cooled down to 0° C., to which 3 mL of triethyl silane was added, heated up to 70° C., kept at this temperature for 2 hours, and then the liquid was filtered off thoroughly. The resulting solid was washed with 120 mL of n-heptane at 50° C. for 4 times, the liquid was filtered off and the resulting product was dried to give a catalyst component (A11) for olefin polymerization. The catalyst component (A11) for olefin polymerization had a content of titanium atoms of 2.0 wt %, and a content of silicon atoms of 0.080 wt %.

Preparation of Polyolefin:

In a 5 L autoclave which had been sufficiently purged with gas phase propylene, 5 mL of a solution of triethylaluminum in hexane (concentration of triethylaluminum: 0.5 mol/L), 1 mL of a solution of cyclohexylmethyl dimethoxysilane (CHMMS) in hexane (concentration of CHMMS: 0.1 mol/L), 10 mL of anhydrous hexane and 6-10 mg of the catalyst component (A11) for olefin polymerization as above prepared were added at room temperature. The autoclave was closed, to which 0.2 standard liters (NL) of hydrogen gas and 2 L of liquid propylene were introduced. With stirring, the temperature was raised up to 70° C. within 15 minutes. After polymerization at 70° C. for 1-3 hours, the stirring was stopped, the remnant propylene monomer was removed, and the resulting product was collected as a polymer P. The results as to the polymerization activity of the catalyst component (A11) for olefin polymerization, the melt index (MI) of the polymer, the isotacticity (II) of the polymer and the bulk density (BD) of the polymer were shown in Table 2.

The polymerization activity of the catalyst was calculated according to the following formula:

Polymerization activity=mass of the polymer P (kg)/ mass (g) of the catalyst component (A11) for olefin polymerization.

Example 12

Preparation of Catalyst Component (A12) for Olefin Polymerization:

In a 300 mL reaction kettle, 10 g of the solid component (a1) prepared in Example 11 and 100 mL of n-hexane were added with stirring to form a suspension. The suspension was heated up to 60° C., to which 3 mL of triisopropyl silane was added, and kept at this temperature for 2 hours. Then the liquid was filtered off thoroughly. The resulting solid was washed with 120 mL of n-hexane at 50° C. for 4 times, the liquid was filtered off, and the resulting product was dried to give a catalyst component (A12) for olefin polymerization. The catalyst component (A12) for olefin polymerization had a content of titanium atoms of 2.1 wt %, and a content of silicon atoms of 0.080 wt %.

Preparation of Polyolefin:

A12 was used in place of A11 to carry out the polymerization according to the preparation process of polyolefin described in Example 11. The results as to the polymerization activity of the catalyst component (A12) for olefin polymerization, the melt index (MI) of the polymer, the isotacticity (II) of the polymer and the bulk density (BD) of the polymer were shown in Table 2.

Example 13

Preparation of Catalyst Component (A13) for Olefin Polymerization:

In a 300 mL reaction kettle, 10 g of the solid component (a1) prepared in Example 11 and 50 mL of n-hexane were added with stirring to form a suspension. The suspension was heated up to 60° C., to which 3 mL of trihexyl silane was added, and kept at this temperature for 2 hours. Then the liquid was filtered off thoroughly. The resulting solid was washed with 120 mL of n-hexane at 50° C. for 4 times, the liquid was filtered off, and the resulting product was dried to give a catalyst component (A13) for olefin polymerization. The catalyst component (A13) for olefin polymerization had a content of titanium atoms of 2.0 wt %, and a content of silicon atoms of 0.050 wt %.

Preparation of Polyolefin: A13 was used in place of A11 to carry out the polymerization according to the preparation process of polyolefin described in Example 11. The results as to the polymerization activity of the catalyst component (A13) for olefin polymerization, the melt index (MI) of the polymer, the isotacticity (II) of the polymer and the bulk density (BD) of the polymer were shown in Table 2.

Example 14

Preparation of Catalyst Component (A14) for Olefin Polymerization:

In a 300 mL reaction kettle, 10 g of the solid component (a1) prepared in Example 11 and 100 mL of n-hexane were added with stirring to form a suspension. The suspension was cooled down to 0° C., to which 3 mL of diphenyl silane was added. The reaction solution was heated up to 60° C. within 30 minutes, kept at this temperature for 2 hours, and then the liquid was filtered off thoroughly. The resulting solid was washed with 120 mL of n-hexane at 50° C. for 4 times, the liquid was filtered off, and the resulting product was dried to give a catalyst component (A14) for olefin polymerization. The catalyst component (A14) for olefin polymerization had a content of titanium atoms of 2.1 wt %, and a content of silicon atoms of 0.120 wt %.

Preparation of Polyolefin:

A14 was used in place of A11 to carry out the polymerization according to the preparation process of polyolefin described in Example 11. The results as to the polymerization activity of the catalyst component (A14) for olefin polymerization, the melt index (MI) of the polymer, the isotacticity (II) of the polymer and the bulk density (BD) of the polymer were shown in Table 2.

Example 15

Preparation of Catalyst Component (A15) for Olefin Polymerization:

In a 300 mL reaction kettle, 10 g of the solid component (a1) prepared in Example 11 and 100 mL of n-hexane were added with stirring to form a suspension. The suspension was heated up to 60° C., to which 0.5 mL of triethyl silane was added, and kept at this temperature for 2 hours. Then the liquid was filtered off thoroughly. The resulting solid was washed with 120 mL of n-hexane at 50° C. for 4 times, the liquid was filtered off, and the resulting product was dried to give a catalyst component (A15) for olefin polymerization. The catalyst component (A15) for olefin polymerization had a content of titanium atoms of 2.2 wt %, and a content of silicon atoms of 0.040 wt %.

Preparation of Polyolefin:

A15 was used in place of A11 to carry out the polymerization according to the preparation process of polyolefin described in Example 11. The results as to the polymerization activity of the catalyst component (A15) for olefin polymerization, the melt index (MI) of the polymer, the isotacticity (II) of the polymer and the bulk density (BD) of the polymer were shown in Table 2.

Example 16

Preparation of Catalyst Component (A16) for Olefin Polymerization:

10 g of alkoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 40 mL of toluene and 60 mL of titanium tetrachloride were added. Then the formulated suspension was added into the kettle. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. to carry out treatment with stirring for 1 hour, and then the liquid was filtered off. The treatment was repeated for two times. Thereafter, a mixture of 120 mL of toluene and 30 mL of titanium tetrachloride was added, and heated up to 110° C., to which 1.5 mL of triethyl silane was added with stirring, and kept at this temperature to carry out treatment with stirring for 1 hour, and then the liquid was filtered off. The resulting solid was washed with 120 mL of n-hexane at 50° C. for 4 times. After filtering off the liquid, the resulting solid was dried to give a catalyst component (A16) for olefin polymerization. The catalyst component (A16) for olefin polymerization had a content of titanium atoms of 2.9 wt %, and a content of silicon atoms of 0.210 wt %.
Preparation of Polyolefin:

A16 was used in place of A11 to carry out the polymerization according to the preparation process of polyolefin described in Example 11. The results as to the polymerization activity of the catalyst component (A16) for olefin polymerization, the melt index (MI) of the polymer, the isotacticity (II) of the polymer and the bulk density (BD) of the polymer were shown in Table 2.

Example 17

Preparation of Catalyst Component (A17) for Olefin Polymerization:

10 g of alkoxy magnesium support prepared in Preparatory Example, 50 mL of toluene and 2.5 mL of di-n-butyl phthalate were formulated into a suspension. In a 300 mL reaction kettle which had been repetitively purged with highly pure nitrogen gas, 30 mL of toluene and 120 mL of titanium tetrachloride were added. Then the formulated suspension was added. The reaction kettle was heated up to 80° C., kept at this temperature for 1 hour, then continuously heated up to 115° C., and kept at this temperature for 2 hours. Thereafter, the liquid (mother liquor) was filtered thoroughly. Then, a mixture of 120 mL of toluene and 30 mL of titanium tetrachloride was added to the resulting solid, and heated up to 110° C. to carry out treatment with stirring for 1 hour, and then the liquid was filtered off. The treatment was repeated for three times. The resulting solid was washed with 120 mL of n-hexane at 50° C. for 2 times. Then 120 ml of hexane was added, and heated up to 60° C., to which 3 mL of triethyl silane was added with stirring, and the mixture was kept at this temperature for 2 hours, and then the liquid was filtered off. The resulting solid was washed with 120 mL of n-hexane at 50° C. for 2 times. After filtering off the liquid, the resulting solid was dried to give a catalyst component (A17) for olefin polymerization. The catalyst component (A17) for olefin polymerization had a content of titanium atoms of 2.0 wt %, and a content of silicon atoms of 0.080 wt %.
Preparation of Polyolefin:

A17 was used in place of A11 to carry out the polymerization according to the preparation process of polyolefin described in Example 11. The results as to the polymerization activity of the catalyst component (A17) for olefin polymerization, the melt index (MI) of the polymer, the isotacticity (II) of the polymer and the bulk density (BD) of the polymer were shown in Table 2.

Example 18

Liquid Phase Bulk Polymerization of 1-Butene:

In a 2 L autoclave which had been sufficiently purged with 1-butene, 2 mL of a solution of triethylaluminum in hexane (concentration of triethylaluminum: 0.5 mmol/mL), 0.5 mL of a solution of diisopropyl dimethoxysilane in hexane (concentration: 0.1 mmol/mL), 10 mL of anhydrous hexane and 10 mg of the catalyst component (A11) for olefin polymerization prepared in Example 11 were added at room temperature. The autoclave was closed, to which 2 standard liters (NL) of hydrogen gas and 350 g of liquid 1-butene were introduced. With stirring, the temperature was raised up to 60° C. within 15 minutes. After polymerization at 60° C. for 1-3 hours, the stirring was stopped, the remnant 1-butene monomer was removed, and the resulting product was collected as a polymer.

The results as to the 1-butene polymerization activity of the catalyst component (A11) for olefin polymerization, and the melt index (MI) of the polymer were shown in Table 2.

TABLE 2

| | Polymerization activity (Kg · polymer/g · Cat) | | | MI | II | BD |
|---|---|---|---|---|---|---|
| | 1 hour | 2 hours | 3 hours | (g/10 min) | (%) | g/cm³ |
| Example 11: A11 | 46 | 89 | 115 | 6.0 | 98.4 | 0.44 |
| Example 12: A12 | 42 | 79 | 112 | 5.8 | 98.6 | 0.45 |
| Example 13: A13 | 41 | 74 | 103 | 5.2 | 98.2 | 0.44 |
| Example 14: A14 | 43 | 76 | 100 | 5.1 | 98.2 | 0.44 |
| Example 15: A15 | 42 | 75 | 105 | 5.4 | 98.6 | 0.44 |
| Example 16: A16 | 50 | 90 | 120 | 10.0 | 97.8 | 0.43 |
| Example 17: A17 | 48 | 88 | 113 | 6.0 | 98.4 | 0.44 |
| Comparative Example 1: a1 | 45 | 69 | 87 | 5.4 | 98.6 | 0.42 |
| Example 18: A11 | 14 | 26 | 34 | 1.2 | — | — |
| Comparative Example 3: a1 | 15 | 22 | 29 | 0.9 | — | — |

Notes:
"1, 2 and 3 hours" in the table refer to that the olefin polymerization reaction, in three experiments, had been carried out for 1 hour, 2 hours and 3 hours respectively.
MI, II (isotacticity) and BD values in the table were all the measured results of the polymer samples taken from one hour polymerization in various examples.

As can be seen from the data in Table 2, the catalyst for olefin polymerization, which was prepared by using the catalyst component for olefin polymerization that had been treated by contacting with the Si—H containing organosilicon compound (b3), could release activity more steadily and evenly, have better hydrogen response and significantly improved total activity, and could result in polymer having increased bulk density, as compared with the catalyst for olefin polymerization which was prepared by using an untreated catalyst component for olefin polymerization.

The invention claimed is:
1. A catalyst component for olefin polymerization, wherein the catalyst component is prepared by contacting a solid component containing magnesium, titanium, halogen and an internal electron donor compound with an organosilicon compound,
wherein the organosilicon compound is one or more selected from the group consisting of a Si—H functional group containing chainlike polysiloxane represented by formula ($I_x$), and a Si—H functional group containing organosilicon compound represented by formula ($I_z$):

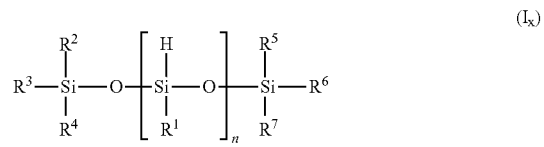

in the formula ($I_x$), $R^1$-$R^7$, which are identical or different, independently of each other represent one selected from the group consisting of a linear or branched alkyl group having 1 to 12 carbon atoms, a cycloalkyl group having 3 to 10 carbon atoms, and an alkaryl group or a substituted or unsubstituted aryl group having 6 to 20 carbon atoms; the degree of polymerization n is an integer of 2 to 100;

$$HSiR^9_zR^{10}_{3-z} \quad (I_z)$$

in the formula ($I_z$), $R^9$ and $R^{10}$, which are identical or different, independently of each other represent one selected from the group consisting of a hydrogen atom, a halogen atom, a linear or branched saturated alkyl group having 1 to 12 carbon atoms, a cycloalkyl group having 3 to 10 carbon atoms, and an alkaryl group or a substituted or unsubstituted aryl group having 6 to 20 carbon atoms; $R^9$ and $R^{10}$ are not simultaneously hydrogen; z is an integer of 0 to 3, wherein the solid component is prepared by suspending the magnesium compound in an inert diluent to form a suspension and then bringing the suspension into contact with the titanium compound and the internal electron donor, and wherein the catalyst component a content of titanium atoms is 1.0-8.0 wt %, a content of magnesium atoms is 10-70 wt %, a content of a halogen atoms is 20-86 wt %, a content of silicon atoms is 0.01-0.5 wt %, and a content of the internal electron donor compound is 2-30 wt %.

2. The catalyst component according to claim 1, wherein an alkoxy magnesium compound represented by formula (II) or an alcohol adduct of the alkoxy magnesium compound represented by formula (II) is used as the magnesium compound for preparing the solid component,

$$Mg(OR^{11})_{2-y}(OR^{12})_y \quad (II)$$

in the formula (II), $R^{11}$ and $R^{12}$, which are identical or different, independently of each other represent a linear or branched alkyl group having 1 to 8 carbon atoms, and $0 \leq y \leq 2$.

3. The catalyst component according to claim 1, wherein the titanium compound used for preparing the solid component is a compound represented by formula (III),

$$TiX_m(OR'')_{4-m} \quad (III)$$

in the formula (III), X is a halogen atom, R" is a hydrocarbon group having 1 to 20 carbon atoms, m is an integer of 0 to 4; wherein the halogen is chlorine, bromine or iodine.

4. The catalyst component according to claim 3, wherein the titanium compound is titanium tetrachloride.

5. The catalyst component according to claim 1, wherein the internal electron donor compound used for preparing the solid component is one or more compound represented by formula (IV),

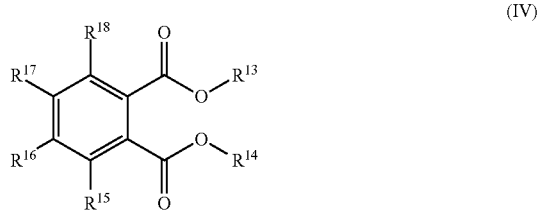

in the formula (IV), $R^{13}$ and $R^{14}$, which are identical or different, independently of each other represent one selected from the group consisting of a linear or branched alkyl group having 1 to 12 carbon atoms, a cycloalkyl group having 3 to 10 carbon atoms, and an alkaryl group or a substituted or unsubstituted aryl group having 6 to 20 carbon atoms; $R^{15}$, $R^{16}$, $R^{17}$ and $R^{18}$ are all hydrogen; or three of them are hydrogen and the other one is a group selected from the group consisting of a halogen atom, a linear or branched alkyl group having 1 to 4 carbon atoms and a linear or branched alkoxy group having 1 to 4 carbon atoms.

6. The catalyst component according to claim 5, wherein the internal electron donor is at least one selected from the grow consisting of diethyl phthalate, di-n-butyl phthalate, diisobutyl phthalate, di-n-octyl phthalate, and diisooctyl phthalate.

7. The catalyst component according to claim 1, wherein the organosilicon compound is a Si—H functional group containing organosilicon compound represented by the formula ($I_z$), which is at least one selected from the group consisting of triethylsilane, tripropylsilane, tributyl silane, tripentyl silane, trihexyl silane, triisopropylsilyl, triphenyl silane, diphenyl silane, dipropyl silane, dibutyl silane, dipentyl silane, dihexyl silane, diisopropyl silane, diisobutyl silane, diisopentyl silane, and diisohexyl silane.

8. The catalyst component according to claim 1, wherein the organosilicon compound is a chainlike polysiloxane represented by the formula ($I_x$), wherein $R^1$ is a linear or branched alkyl group having 1 to 6 carbon atoms, a cycloalkyl group or an aryl group, and $R^2$-$R^7$ are methyl.

9. The catalyst component according to claim 8, wherein the chainlike polysiloxane represented by the formula ($I_x$) is at least one selected from the group consisting of 1,1,1,3,5,7,7,7-octamethyltetrasiloxane (n=2), polymethylhydrosiloxane, polyethylhydrosiloxane, polyphenylhydrosiloxane, and polycyclohexylhydrosiloxane.

10. The catalyst component according to claim 1, wherein in the catalyst component, the content of titanium atoms is 1.6-4.0 wt %; the content of magnesium atoms is 15-40 wt %; the content of halogen atoms is 36-80%; the content of silicon atoms is 0.02-0.5 wt %; the content of the internal electron donor compound is 3-20 wt %.

11. A process for preparing the catalyst component according to claim 1, the process comprising contacting the organosilicon compound with the solid component as has been already prepared into reaction.

12. A process for preparing the catalyst component according to claim 1, wherein the organosilicon compound is added to effect the reaction during the preparation of the solid component which, in time sequence, comprises the following three steps: forming mother liquor, titanium treatment and washing;

wherein the step of forming mother liquor comprises suspending a magnesium compound in an inert diluent to form a suspension, and then bringing the suspension into contact with a titanium compound and an internal electron donor to obtain a solid dispersion system, which is called as a mother liquor;

the titanium treatment step comprises filtering the mother liquor, and suspending the resulting solid substance in a titanium tetrachloride-containing solution to effect treatment; and the washing step comprises filtering and washing the solid substance obtained in the preceding step.

13. The process according to claim 12, wherein the organosilicon compound is added after the step of forming the mother liquor and before the titanium treatment step during the preparation of the solid component.

14. The process according to claim 12, wherein the organosilicon compound is added in the titanium treatment step during the preparation of the solid component.

15. The process according to claim 12, wherein the organosilicon compound is added in the washing step after the titanium treatment step during the preparation of the solid component.

16. A catalyst for olefin polymerization, which comprises the catalyst component according to claim 1, and further comprises an organoaluminum compound as cocatalyst, and optionally an external electron donor compound.

17. The catalyst according to claim 16, wherein the organoaluminum compound is at least one selected from the group consisting of trimethylaluminum, triethylaluminum, triisobutylaluminum, trioctylaluminum, diethylaluminum hydride, diisobutylaluminum hydride, diethylaluminum chloride, diisobutylaluminum chloride, sesquiethylaluminum chloride and ethylaluminum dichloride.

18. The catalyst according to claim 16, wherein the external electron donor compound is an organosilicon compound represented by formula (VI):

$$R^{1''}_{m''}R^{2''}_{n''}Si(OR^{3''})_{4-m''-n''} \quad (VI)$$

wherein, $R^{1''}$ and $R^{2''}$, which are identical or different, independently of each other are selected from the group consisting of a halogen atom, a hydrogen atom, an alkyl group having 1 to 20 carbon atoms, a cycloalkyl group having 3 to 20 carbon atoms, an aryl group having 6 to 20 carbon atoms and a haloalkyl group having 1 to 20 carbon atoms; $R^{3''}$ is one selected from the group consisting of an alkyl group having 1 to 20 carbon atoms, a cycloalkyl group having 3 to 20 carbon atoms, an aryl group having 6 to 20 carbon atoms and a haloalkyl group having 1 to 20 carbon atoms; m" and n" are respectively an integer of 0 to 3, and m"+n"<4.

19. The catalyst according to claim 16, wherein the external electron donor compound is at least one selected from the group consisting of dicyclopentyl dimethoxysilane, diisopropyl dimethoxysilane, diisobutyl dimethoxysilane, cyclohexylmethyl dimethoxysilane, diphenyl dimethoxysilane, methyltert-butyl dimethoxysilane, and tetraethoxysilane.

20. A process for homopolymerization and copolymerization of olefins, the process comprising utilizing the catalyst component according to claim 1, wherein at least one of the olefins is an olefin represented by formula $CH_2=CHR$, wherein R is hydrogen or an alkyl group having 1 to 6 carbon atoms.

21. The process according to claim 20, wherein the olefin is ethylene, propylene or 1-n-butene.

22. A process for homopolymerization and copolymerization of olefins, the process comprising utilizing the catalyst according to claim 16, wherein at least one of the olefins is an olefin represented by formula $CH_2=CHR$, wherein R is hydrogen or an alkyl group having 1 to 6 carbon atoms.

23. The process according to claim 22, wherein the olefin is ethylene, propylene or 1-n-butene.

* * * * *